United States Patent
Mallernee et al.

[11] Patent Number: 6,159,532
[45] Date of Patent: Dec. 12, 2000

[54] METHOD FOR MAKING POLYMERIC GLOVE WITH THIN, FLUOROELASTOMERIC COATING

[75] Inventors: Rick Mallernee, Bucyrus; John Bordas, Greenwich, both of Ohio

[73] Assignee: Mapa Pioneer Corporation, Willard, Ohio

[21] Appl. No.: 09/334,345

[22] Filed: Jun. 16, 1999

[51] Int. Cl.[7] .................................................... B05D 5/00
[52] U.S. Cl. ............................ 427/2.3; 427/421; 264/129
[58] Field of Search .......................... 427/421, 2.3, 180, 427/181; 264/129, 301, 307, 340

[56] References Cited

U.S. PATENT DOCUMENTS

| | | | |
|---|---|---|---|
| 4,218,779 | 8/1980 | Hart et al. | 2/168 |
| 5,019,096 | 5/1991 | Fox, Jr. et al. | 623/1 |
| 5,493,899 | 2/1996 | Beck et al. | 73/40.7 |

*Primary Examiner*—Timothy Meeks
*Assistant Examiner*—Jennifer Calcagni
*Attorney, Agent, or Firm*—Marshall, O'Toole, Gerstein, Murray & Borun

[57] ABSTRACT

A chemical-resistant protective glove includes a polymer base with a thin fluoroelastomeric coating. The glove is made by first placing the base on a mounting frame and inflating it with gas to spread the fingers. Successive thin layers of a water-base emulsion of the fluoroelastomeric material are then sprayed on the base. The final coating is applied with a relatively high air flow, creating a matte finish.

13 Claims, 3 Drawing Sheets

METHOD FOR MAKING POLYMERIC GLOVE WITH THIN, FLUOROELASTOMERIC COATING

BACKGROUND OF THE INVENTION

This invention relates generally to protective gloves and more particularly to chemical-resistant protective gloves.

Polymers such as polychloroprene, acrylonitrile, natural or synthetic isoprene, and butyl rubber provide relatively inexpensive and useful materials for making protective gloves. Gloves can be made by injection molding or by dipping a glove former into a vat of such polymers.

Because polymers have different characteristics, it has in the past been found useful to make composite gloves of successive laminations of different materials. U.S. Pat. No. 5,459,880, for example, teaches that a glove with high strength and oil resistance can be made at a low cost by successively immersing a glove former in two different rubber latexes.

It is also known that some fluoroelastomeric materials, such as the commercially-available VITON® or TECHNI-FLON fluoroelastomers, can be used to provide improved chemical resistance to a wide variety of toxic corrosive chemicals and solvents, radiation, and flammablity. U.S. Pat. No. 4,218,779 describes the desirability of using such materials as the outer layer of a protective glove.

Unfortunately, the cost and physical characteristics of many fluoroelastomeric materials make the conventional successive-immersion process impractical as a method for applying a fluoroelastomeric coating on a glove. Apparently unable to find a cost-effective way to add a thin layer of fluoroelastomeric material over a less-expensive polymeric base, some manufacturers have chosen to make gloves entirely of the more expensive fluoroelastomeric material.

Another problem with using fluoroelastomeric materials on gloves stems from the fact that the fluoroelastomeric materials tend to create a very smooth, slick surface. This surface reduces grip when handling wetted objects. The smooth, slick surfaces of such gloves also tend to adhere to one another when the gloves are packaged, making it difficult to subsequently separate the gloves. In order to overcome this as well as to allow the gloves to don more easily, most fluoroelastomer gloves are powdered inside.

There is a long-felt need for a cost-effective way to add a thin layer of fluoroelastic material over a polymer glove base, and for a fluoroelastomer-coated glove with a non-adhesive finish that will increase wet gripping and allow the gloves to be sold free of powder.

SUMMARY OF THE INVENTION

The invention relates to the use of a spray to apply a thin layer of a fluoroelastomeric material to the outside surface of a polymeric glove base.

Spraying of the glove base while it remains on the glove former on which the glove base is formed would be undesirable because gloves are conventionally formed inside-out on the formers; the surface of the glove next to the former generally becomes the outside surface of the completed glove, while the surface of the glove that faces outwardly while the glove is on the former becomes the insider surface of the completed glove. Accordingly, spraying a glove base while it is still on the former would lead to the spray coating being applied to what will become the inside surface of the completed glove. Since one of the purposes of the fluoroelastomeric material is to protect the less-resistant polymeric base from external chemicals, applying the fluoroelastomeric material to what will become the inside surface of the completed glove is not particularly desirable. A second problem is that the fingers on the former are too close together to allow good access for the application of the fluoroelastomer. Lastly, it would be very difficult to design a system that would prevent overspraying onto the glove former. After the newly formed glove is removed from the former, overspray build-up would interfere with subsequent glove formation.

In order to apply the fluoroelastomeric spray layer to the outside surface of the completed glove, the glove base is first prepared, cured, and removed from its former. The cured glove base is then placed on a mounting fixture with the final outside surface facing out, where it can be conveniently sprayed.

One problem faced when attempting to apply a spray coating to a glove is that the fingers of the glove make it difficult to direct the spray to reach the areas between the fingers. In order to overcome this problem, the glove base is inflated with air while on the mounting frame. Inflating the glove causes the fingers to spread, making it easier to cover the surface of the glove base with the spray.

Spraying a finished polymeric glove base with a conventional, solvent-based fluoroelastomeric material could result in the solvents damaging the glove base. This potential problem is avoided by using a water-based fluoroelastomeric material for the spray coating.

After the initial coating is applied, a final, atomized spray of the fluoroelastomeric material can be used to give a matte finish to the completed glove. The matte finish does not have the adhesive characteristics of conventional fluoroelastomic gloves, facilitating handling.

DETAILED DESCRIPTION OF THE INVENTION

Figure 1:
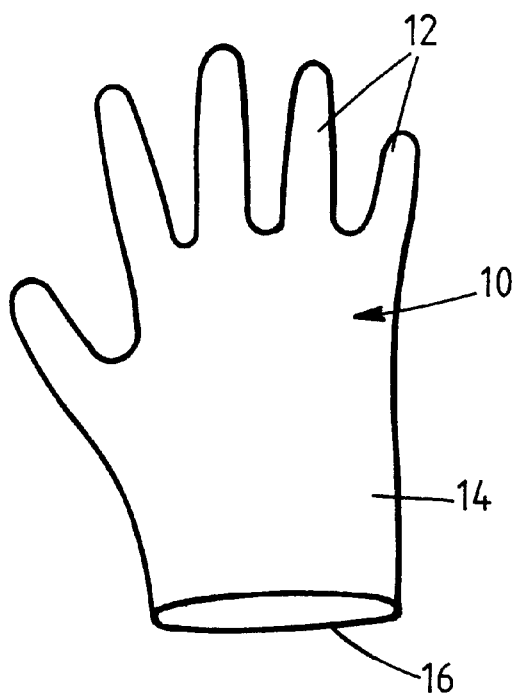
FIG. 1 is a plan view of a glove in accordance with the present invention.
Figure 2:
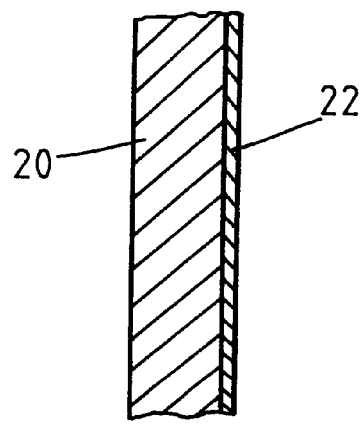
FIG. 2 is a sectional view of a wall of the glove of FIG. 1.

FIG. 1 shows a protective glove 10 in accordance with the present invention. As illustrated, the glove has fingers 12 and a cuff 14 with an open lower end 16. As seen in FIG. 2, the walls of the glove include a glove base 20 next to the wearer's skin, with a thin fluoroelastomeric coating 22 on the outer surface. The glove base can be made of any of a variety of polymers, including acrylonitrile, chloroprene, or natural latex. The fluoroelastomer used in the coating is preferably one providing good resistence to a wide variety of toxic corrosive chemicals and solvents. A copolymer of vinylidene fluoride, hexafluoropropylene, and tetrafluoropropylene, such as one of those sold by DuPont under its VITON® trademark, may be particularly useful.

The glove base 20 is made in any conventional way. For example, a glove former of an appropriate shape can be dipped into a vat of polymer. Upon removing the former from the vat, a layer of polymer remains on the former. The former can then be placed in an oven to harden or vulcanize the polymer, forming the glove base. After vulcanization, the glove base can be readily removed from the glove former. The primary purpose of vulcanization before adding the fluoroelastomeric coating is to strengthen the glove base sufficiently so that it can be removed from the glove former without being damaged, and so that its full protective properties can be realized. It may not be necessary to complete the vulcanization of the glove base at this time.

Figure 3:
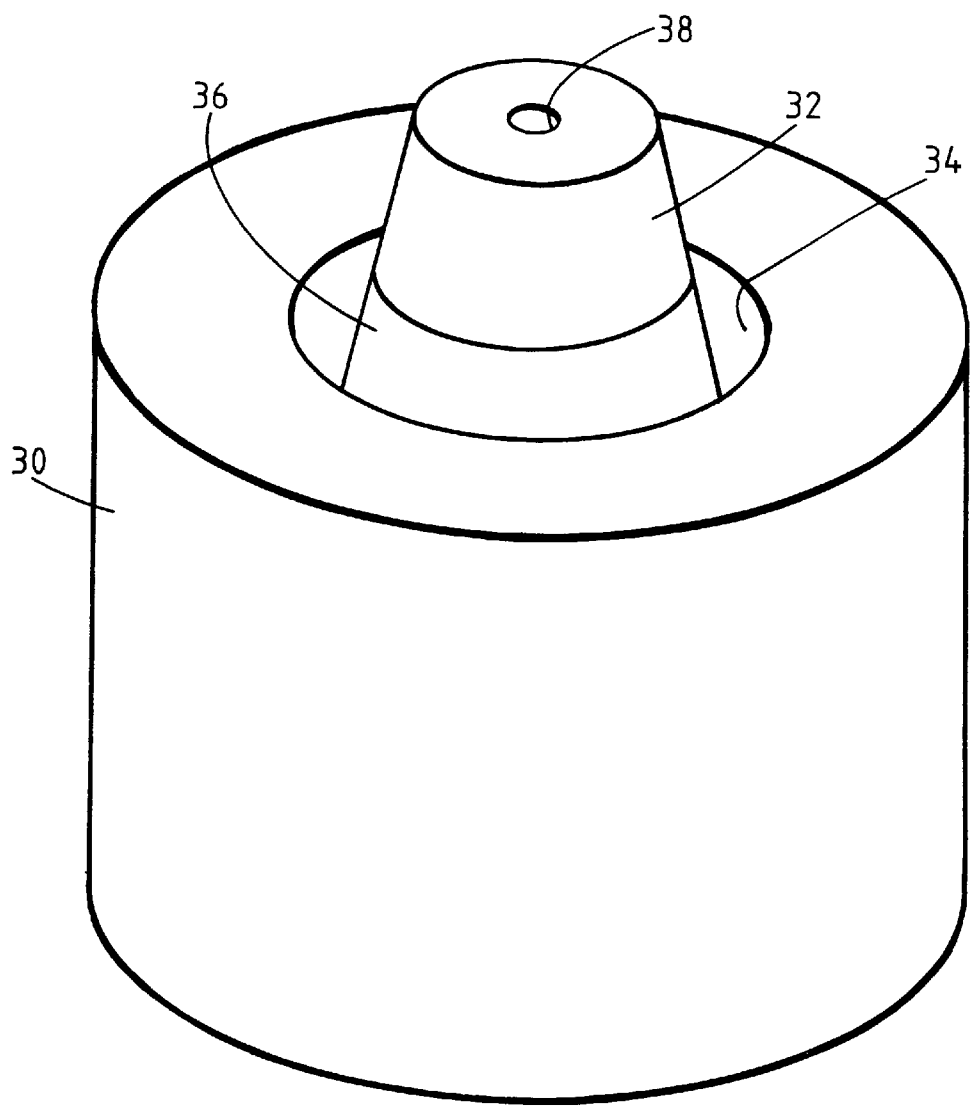
FIG. 3 is a perspective view of a mounting fixture used in making the glove.

To apply the fluoroelastomeric coating 22, the open lower end 16 of the glove base 20 is placed over a mounting fixture 30, as seen in FIG. 3. As illustrated, the mounting fixture includes a cone-shaped mounting neck 32 within a sealing ring 34. The open lower end of the glove base slides over the mounting neck into an annular opening between the mounting neck and the sealing ring. After the lower end of the glove base is positioned over the mounting neck, an inflatable ring, bladder, or diaphragm 36 on the mounting neck is inflated, pressing the lower end of the glove base against the sealing ring and, as a result, securing the glove base to the mounting fixture and temporarily creating an air-tight seal of the open lower end of the glove base. Of course, the mounting fixture could be made in different shapes or forms, and many other structures or methods could be used to secure the glove base to the mounting fixture and to temporarily seal the lower open end of the glove.

Figure 4:
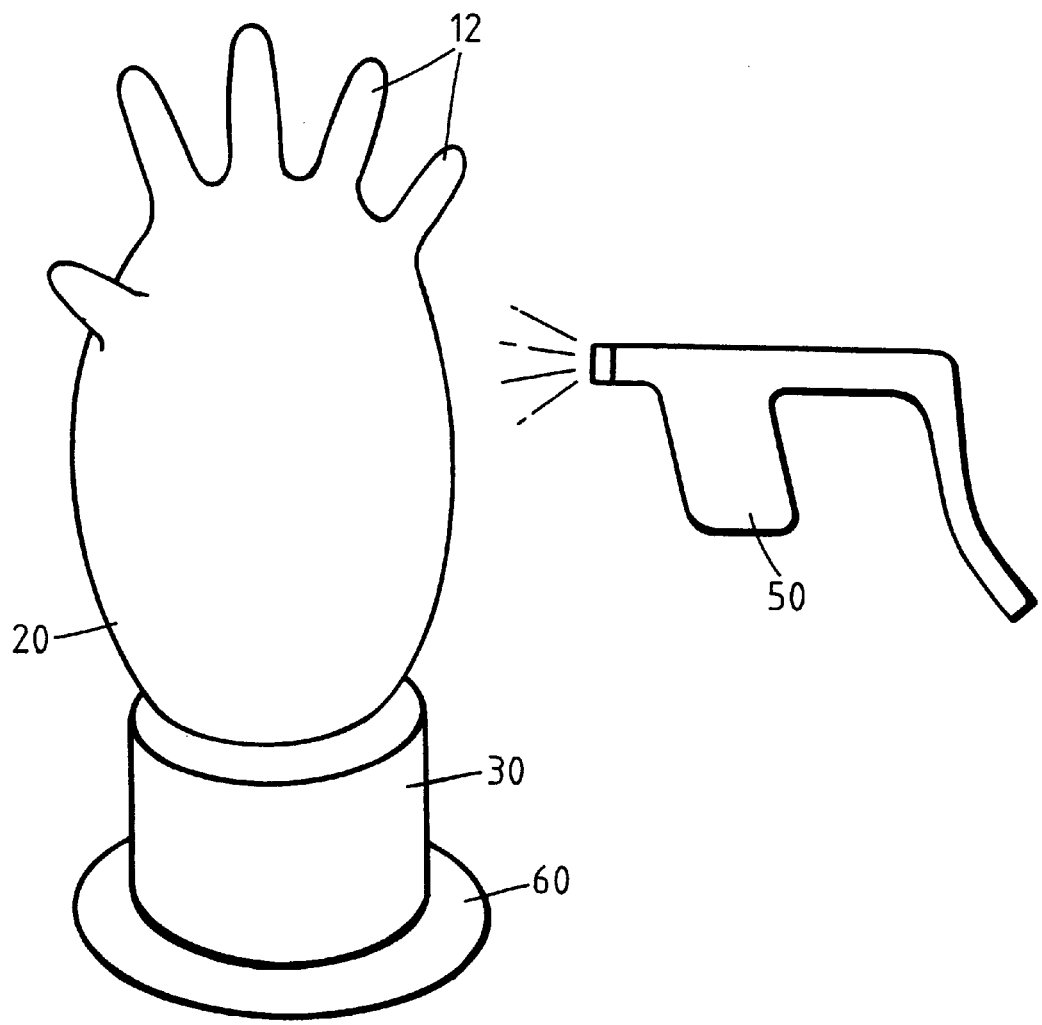
FIG. 4 is a view of a glove base being sprayed with a fluoroelastomic coating.

A pipe 38 through the mounting neck 32 of the mounting fixture 30 is attached to a gas source (not shown). The pipe and gas source provide a means for inflating the glove base 20 after it is secured to the mounting fixture. Preferably, enough gas is added through the pipe to remove wrinkles from the glove base and to cause the ends of the fingers 12 to spread about 15 to 20 mm. apart, as seen in FIG. 4. Too much gas will, of course, cause the glove to burst or fly off the mounting neck, while too little gas will result in the fingers remaining too close together for effective spraying. With a 0.011 inch thick glove base, gas pressure in the glove may be preferably about 0.5 to 1.0 psi.

The fluoroelastomeric material used to create the coating 22 is preferably a water-based emulsion that is sprayed onto the glove base while the glove base 20 is positioned, in an inflated state, on the mounting fixture 30. While a solvent-based emulsion might also be used, care would need to be taken to assure that the solvent in the spray does not damage the glove base. Spraying a solvent-based emulsion might also require special steps to prevent environmental damage.

In the process illustrated, the spray may be applied with a hand-held paint spray gun 50 using forced air. Preferably, the mounting fixture 30 is provided on a rotatable base 60 to allow the operator to spray all desired parts of the glove base with a minimum of operator movement. As illustrated, the rotatable base can rotate through 360 degrees, and the speed of rotation can be electronically varied.

Preferably, the fluoroelastomeric coating 22 on the completed glove 10 is 0.003–0.004 inches thick, and is created by spraying a series of thin coatings of the desired fluoroelastomer onto the glove base 20. Sufficient time is left between coatings to allow the previous coating to dry. In the illustrated embodiment, two minutes of air drying is allowed between coatings, but drying time may be affected by the local environment.

Preferably, the final coating of spray is applied with a reduced output of fluoroelastomeric emulsion and a relatively high airflow from the spray gun. This results in a matte surface on the completed glove that is less sticky, reducing the problem of gloves sticking together when packaged.

After the final coating is sprayed, the glove 10 remains inflated on the mounting fixture 30 for preliminary drying. Again, two minutes are allowed, but the local environment may affect the drying time.

After the preliminary drying, the glove 10 is slowly deflated (for example, over a period of 20 to 30 seconds) and removed from the mounting fixture 30. Preferably, the glove is then internally supported by a vertical mandrel and placed into an oven for further drying and vulcanization of the fluoroelastomeric coating 22. For example, the glove may be dried and vulcanized in a 212 degree Fahrenheit oven for one hour. The required time and temperature may of course vary. For example, better cross-linking may be obtained by using a higher temperature, but care must be taken to avoid damaging the polymeric glove base 20. When the glove base is made of acrylonitrile, one-hour vulcanization of the fluoroelastomer coating may be performed at a temperature as high as 260 degrees Fahrenheit.

After vulcanization, the glove 10 is removed from the oven and may be inspected over a light tube. Areas that the spray coating did not sufficiently cover are easily seen over such a light, and can be marked for re-spraying and vulcanization. Alternatively, a light tube might be added to the mounting frame 30 so that areas of insufficient coverage can be detected before the glove proceeds to vulcanization of the coating 22.

No unnecessary limitations should be read into what has been described. Modifications should be obvious to those skilled in the art.

We claim:

1. A method of manufacturing a chemical-resistant glove, the method comprising the steps of:

making a glove base from a polymeric material, wherein the glove base is made by applying a layer of polymer on a glove former, at least partially polymerizing the layer of polymer to create the glove base, and removing the glove base from the former;

securing the glove base on a mounting fixture;

injecting a gas between the glove base and the mounting fixture, causing the fingers of the glove base to spread;

spraying a fluoroelastomeric coating onto the outside surface of the glove base; and removing the coated glove base from the mounting fixture.

2. The method of claim 1, in which the glove base is secured to the mounting fixture by inflating an inflatable ring against a sealing ring.

3. The method of claim 1, in which the fluoroelastomeric coating is a water-based emulsion.

4. The method of claim 1, in which the mounting fixture is rotated during the spraying of the fluoroelastomeric coating.

5. The method of claim 1, in which the glove is inspected to detect and correct areas of insufficient coating before the glove proceeds to vulcanization of the coating.

6. The method of claim 5, in which a light tube is used to detect areas of insufficient coating.

7. The method of claim 1, in which a final fluoroelastomeric coating is applied with an increased airflow.

8. A method of manufacturing a chemical-resistant glove, the method comprising the steps of:

making a glove base from a polymeric material, wherein the glove base is made by applying a layer of polymer on a glove former, at least partially polymerizing the layer of polymer to create the glove base, and removing the glove base from the former;

securing the glove base on a mounting fixture;

injecting a gas between the glove base and the mounting fixture, causing the fingers of the glove base to spread;

spraying a coating of fluoroelastomer onto the outside surface of the glove base;

spraying a second coating of fluoroelastomer with a reduced output of fluoroelastomer, creating a matte finish; and removing the coated glove base from the mounting fixture.

9. The method of claim 8, in which the glove base is secured to the mounting fixture by inflating an inflatable ring against a sealing ring.

10. The method of claim 8, in which the fluoroelastomeric coating is a water-based emulsion.

11. The method of claim 8, in which the mounting fixture is rotated during the spraying of the fluoroelastomeric coating.

12. The method of claim 8, in which the glove is inspected to detect and correct areas of insufficient coating before the glove proceeds to vulcanization of the coating.

13. The method of claim 12, in which a light tube is used to detect areas of insufficient coating.

* * * * *